(12) United States Patent
Huang et al.

(10) Patent No.: US 9,004,693 B2
(45) Date of Patent: Apr. 14, 2015

(54) PROJECTOR

(71) Applicants: Sintai Optical (Shenzhen) Co., Ltd., Shenzhen, Guangdong Province (CN); Asia Optical International Ltd., Tortola (GB)

(72) Inventors: Ju-Ping Huang, Taichung (TW); Yun-Yi Lin, Taichung (TW)

(73) Assignees: Sintai Optical (Shenzhen) Co., Ltd., Shenzhen, Guandong Province (CN); Asia Optical International Ltd., Tortola (VG)

( * ) Notice: Subject to any disclaimer, the term of this patent is extended or adjusted under 35 U.S.C. 154(b) by 187 days.

(21) Appl. No.: 13/922,291

(22) Filed: Jun. 20, 2013

(65) Prior Publication Data

US 2014/0002756 A1   Jan. 2, 2014

(30) Foreign Application Priority Data

Jun. 28, 2012 (TW) .............................. 101123212 A

(51) Int. Cl.
| | | |
|---|---|---|
| *H04N 9/31* | (2006.01) | |
| *G03B 21/20* | (2006.01) | |
| *G02F 1/1335* | (2006.01) | |
| *G02F 1/13* | (2006.01) | |
| *G02B 27/28* | (2006.01) | |
| *G03B 21/14* | (2006.01) | |

(52) U.S. Cl.
CPC ........ *G02F 1/133536* (2013.01); *G02F 1/1313* (2013.01); *G03B 21/2066* (2013.01); *H04N 9/3167* (2013.01); *G02B 27/286* (2013.01); *G03B 21/14* (2013.01)

(58) Field of Classification Search
CPC ............. H04N 9/3167; G03B 21/2026; G03B 21/2066; G03B 21/2093; G02B 27/28; G02B 27/283; G02B 27/285; G02B 27/286; F21V 9/14

USPC .......................................................... 353/20
See application file for complete search history.

(56) References Cited

U.S. PATENT DOCUMENTS 6,064,523 A * 5/2000 Budd et al. ............... 359/485.07

(Continued)

FOREIGN PATENT DOCUMENTS

| TW | 200921160 A | 5/2009 |
|---|---|---|
| TW | 201037451 A | 10/2010 |
| TW | 201122312 A | 7/2011 |

OTHER PUBLICATIONS

English Abstract translation of TW201037451 (Published Oct. 16, 2010).

(Continued)

*Primary Examiner* — William C Dowling
*Assistant Examiner* — Ryan Howard
(74) *Attorney, Agent, or Firm* — McClure, Qualey & Rodack, LLP

(57) ABSTRACT

A projector includes a polarization conversion system and a reflective polarizer. The polarization conversion system receives unpolarized light including first S-polarized light and first P-polarized light, wherein the first S-polarized light passes through the polarization conversion system, a part of the first P-polarized light is converted into second S-polarized light after passing through the polarization conversion system, and another part of the first P-polarized light remains unchanged after passing through the polarization conversion system. The reflective polarizer allows the first S-polarized light and the second S-polarized light to pass through and reflects the first P-polarized light back to the polarization conversion system.

10 Claims, 10 Drawing Sheets

(56) References Cited

U.S. PATENT DOCUMENTS

| | | | |
|---|---|---|---|
| 7,583,439 B2* | 9/2009 | Tsai et al. | 359/485.03 |
| 2003/0071972 A1* | 4/2003 | Ito et al. | 353/20 |
| 2011/0235175 A1* | 9/2011 | Poon et al. | 359/487.04 |

OTHER PUBLICATIONS

English Abstract translation of TW200921160 (Published May 16, 2009).

English Abstract translation of TW201122312 (Published Jul. 1, 2011).

\* cited by examiner

PROJECTOR

BACKGROUND OF THE INVENTION

1. Field of the Invention

The invention relates to a projector and more particularly to a projector with polarized light recycling system for improving the use efficiency of polarized light.

2. Description of the Related Art

In some kinds of projectors, for example an LCOS projector, the optical engine includes a liquid crystal panel which can only use linear polarized light. In these kinds of projectors, therefore, unpolarized light generated by the light source module is converted into linear polarized light for the utilizing of the liquid crystal panel. However, about a half of light energy is lost when unpolarized light is converted into linear polarized light, and only a half of light energy (linear polarized light) can be utilized by the liquid crystal panel. In order to convert more unpolarized light into linear polarized light for the utilizing of the liquid crystal panel, a polarization conversion system is developed to convert the useless light into useful linear polarized light for the liquid crystal panel.

As shown in FIG. 1, a well-known polarization conversion system 10 includes a number of strip-shaped polarization beam splitters 102 and retarders 103. When unpolarized light $U_{101}$ is directed toward the polarization conversion system 10, fifty percent of the unpolarized light $U_{101}$, represented by the first S-polarized light $S_{104}$, is reflected by polarization beam splitter 102 and the other fifty percent of the unpolarized light $U_{101}$, represented by the first P-polarized light $P_{105}$, passes through the polarization beam splitter 102. The reflected first S-polarized light $S_{104}$ is reflected once more and leaves the polarization conversion system 10. The first P-polarized light $P_{105}$ continues to pass through the retarder 103, wherein the most part of it is converted to the second S-polarized light $S_{106}$ and a little part of it is not converted that is represented by the second P-polarized light $P_{107}$. Thus, the polarization conversion system 10 converts useless linear polarized light $P_{105}$ into useful linear polarized light $S_{106}$. The well-known polarization conversion system 10 effectively increases the polarized light conversion efficiency of light source, but there is still little energy of linear polarized light $P_{107}$ cannot be converted into useful linear polarized light.

BRIEF SUMMARY OF THE INVENTION

The invention provides a projector which is capable of increasing the polarized light conversion efficiency of the light source and enhancing the system performance such as brightness and contrast ratio, without increasing the output power of the light source, the quantity of the light sources, and the volume of the optical engine.

The projector in accordance with an exemplary embodiment of the invention includes a light source module, a polarization conversion system, a reflective polarizer, a liquid crystal panel and a projection lens. The light source module emits unpolarized light which includes first S-polarized light and first P-polarized light. The polarization conversion system receives the unpolarized light, wherein the first S-polarized light passes through the polarization conversion system, a part of the first P-polarized light is converted into second S-polarized light after passing through the polarization conversion system, and another part of the first P-polarized light remains unchanged after passing through the polarization conversion system. The reflective polarizer allows the first S-polarized light and the second S-polarized light to pass through and reflects the first P-polarized light back to the polarization conversion system. The liquid crystal panel adds image information to the first S-polarized light and the second S-polarized light to obtain a projection light. The projection lens projects the projection light.

In another exemplary embodiment, the projector further includes a lens array which homogenizes the unpolarized light before the unpolarized light is received by the polarization conversion system.

In yet another exemplary embodiment, the lens array includes 3×5 pieces of micro biconvex lenses which are with spherical surfaces or aspheric surfaces.

In another exemplary embodiment, the polarization conversion system includes a plurality of strip-shaped polarization beam splitters and retarders. The thickness of the polarization beam splitters and the interval between the retarders are both substantially equal to a half of length of the micro biconvex lens.

In yet another exemplary embodiment, the polarization conversion system is disposed at the focus of the lens array.

In another exemplary embodiment, the projector further includes a polarization beam splitter which is substantially parallel to the reflective polarizer and directs the first S-polarized light and the second S-polarized light which pass through the reflective polarizer to the liquid crystal panel.

In yet another exemplary embodiment, the projector further includes a condenser lens which focuses the first S-polarized light and the second S-polarized light generated by the polarization conversion system.

In another exemplary embodiment, the condenser lens is substantially parallel to the reflective polarizer, and the first S-polarized light and the second S-polarized light pass through the reflective polarizer before reaching the condenser lens.

In yet another exemplary embodiment, the reflective polarizer is substantially parallel to the polarization conversion system.

In another exemplary embodiment, the projector further includes a mirror which changes a propagation direction of the first S-polarized light and the second S-polarized light generated by the polarization conversion system, wherein the first S-polarized light and the second S-polarized light pass through the reflective polarizer first before reaching the mirror.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
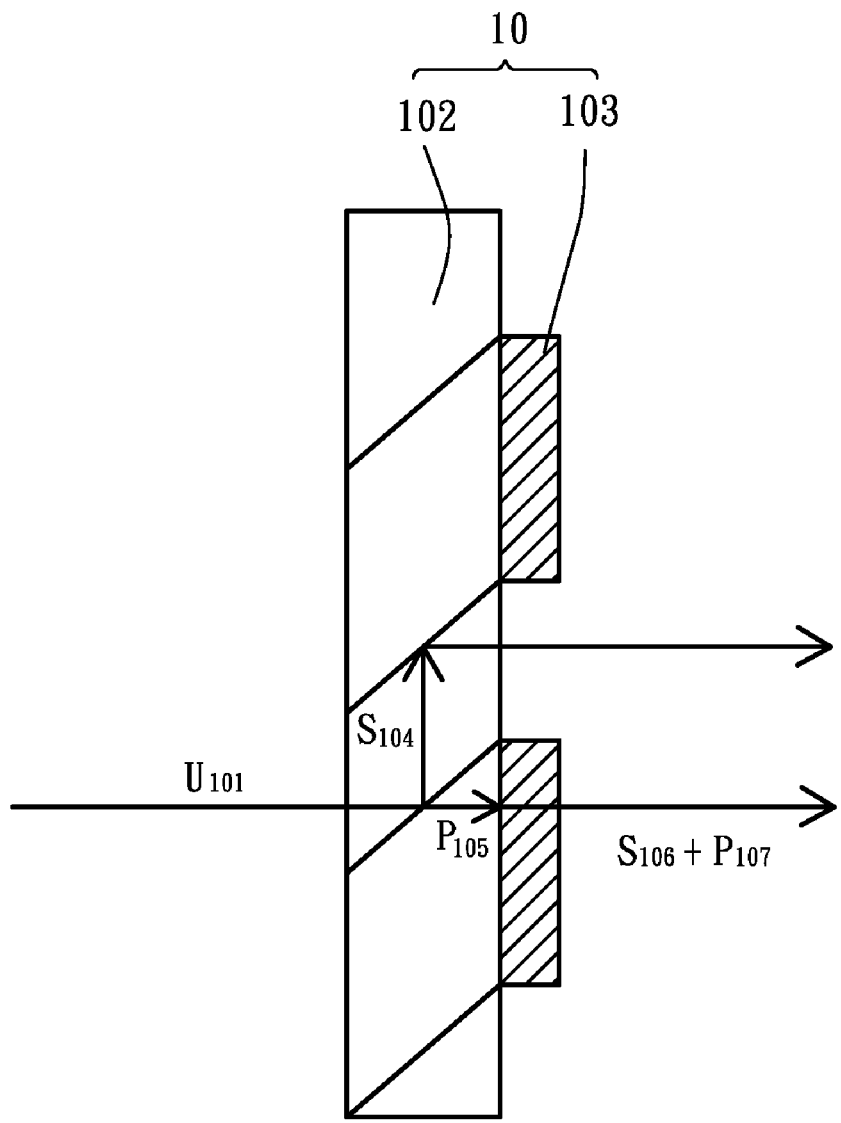
FIG. 1 is a schematic diagram of a well-known polarization conversion system.
Figure 2:
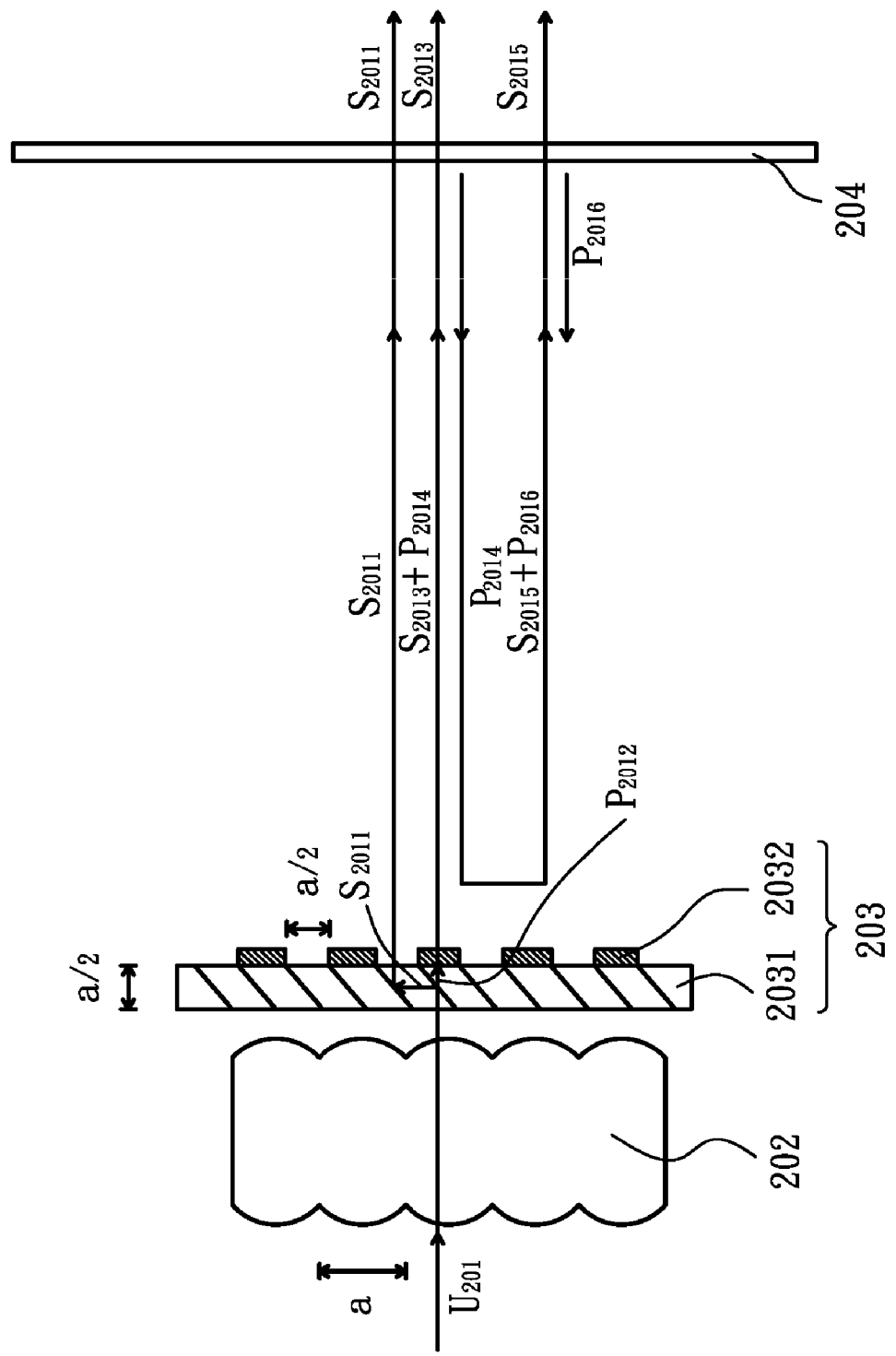
FIG. 2 is a diagram for illustrating the principal elements and operation principles of the polarization recycling system in accordance with the invention.

FIG. 2 is a diagram for illustrating the principal elements and operation principles of the polarization recycling system in accordance with the invention. As shown in FIG. 2, the projector of the invention includes a lens array 202, a polarization conversion system 203 and a reflective polarizer 204. The polarization conversion system 203 includes a polarization beam splitter 2031 and a retarder 2032. When the unpolarized light $U_{201}$ is focused by the lens array 202 and passes through polarization beam splitter 2031, fifty percent of the unpolarized light $U_{201}$, represented by the first S-polarized light $S_{2011}$, is reflected and the other fifty percent of the unpolarized light $U_{201}$, represented by the first P-polarized light $P_{2012}$, passes through. The reflected first S-polarized light $S_{2011}$ is reflected once more and leaves the polarization conversion system 203. The first P-polarized light $P_{2012}$ continues to pass through the retarder 2032, wherein the most part of it is converted to the second S-polarized light $S_{2013}$ and a little part of it is not converted that is represented by the second P-polarized light $P_{2014}$. The first S-polarized light $S_{2011}$, the second S-polarized light $S_{2013}$ and the second P-polarized light $P_{2014}$ are directed to the reflective polarizer 204, wherein the first S-polarized light $S_{2011}$ and the second S-polarized light $S_{2013}$ can pass through the reflective polarizer 204, and the second P-polarized light $P_{2014}$ is reflected back to the polarization conversion system 203 by the reflective polarizer 204 and converted to S-polarized light for use once again. In detail, after the second P-polarized light $P_{2014}$ passes through the polarization conversion system 203, the most part of it is converted to the third S-polarized light $S_{2015}$ and a little part of it is not converted that is represented by the third P-polarized light $P_{2016}$. The third S-polarized light $S_{2015}$ can pass through the reflective polarizer 204 for use, while the third P-polarized light $P_{2016}$ is reflected back to the polarization conversion system 203 by the reflective polarizer 204 and converted to S-polarized light again. This cycle repeatedly continues. The polarized light $P_{2014}$, $P_{2016}$ . . . which are originally useless can be recycled and converted into useful polarized light, thus enhancing the polarized light conversion efficiency.

In actual operation, the P-polarized light $P_{2014}$, $P_{2016}$ . . . are not completely reflected by the reflective polarizer 204 and there is certainly a little loss of energy during reflections. Nevertheless, the P-polarized light before reflection and after reflection is not particularly distinguished in this disclosure to avoid complicated descriptions and labeling. Specifically, in FIG. 2, the second P-polarized light $P_{2014}$ remains named the second P-polarized light $P_{2014}$ after reflected by the reflective polarizer 204, and the third P-polarized light $P_{2016}$ remains named the third P-polarized light $P_{2016}$ after reflected by the reflective polarizer 204. Other P-polarized light is named in the same way without distinguishing the difference. Similarly, the first, second, third S-polarized light $S_{2011}$, $S_{2013}$, $S_{2015}$ . . . cannot completely pass through the reflective polarizer 204, and there is certainly a little loss of energy. Nevertheless, each of the first, second, third S-polarized light $S_{2011}$, $S_{2013}$, $S_{2015}$ . . . before penetration and after penetration are not distinguished to avoid complicated descriptions and labeling.

The structure and principle of the reflective polarizer are described as follows. A reflective polarizer allows light of a specific polarization direction to pass through and reflects light of another specific polarization direction, wherein the polarization directions of the transmitted light and reflected light are perpendicular to each other. There are two kinds of reflective polarizers: one is the dual brightness enhancement film (abbreviated as DBEF), and the other is the wire grid reflective polarizer. However, it is understood that the invention is not limited to the use of the two kinds of reflective polarizers.

Figure 3A:
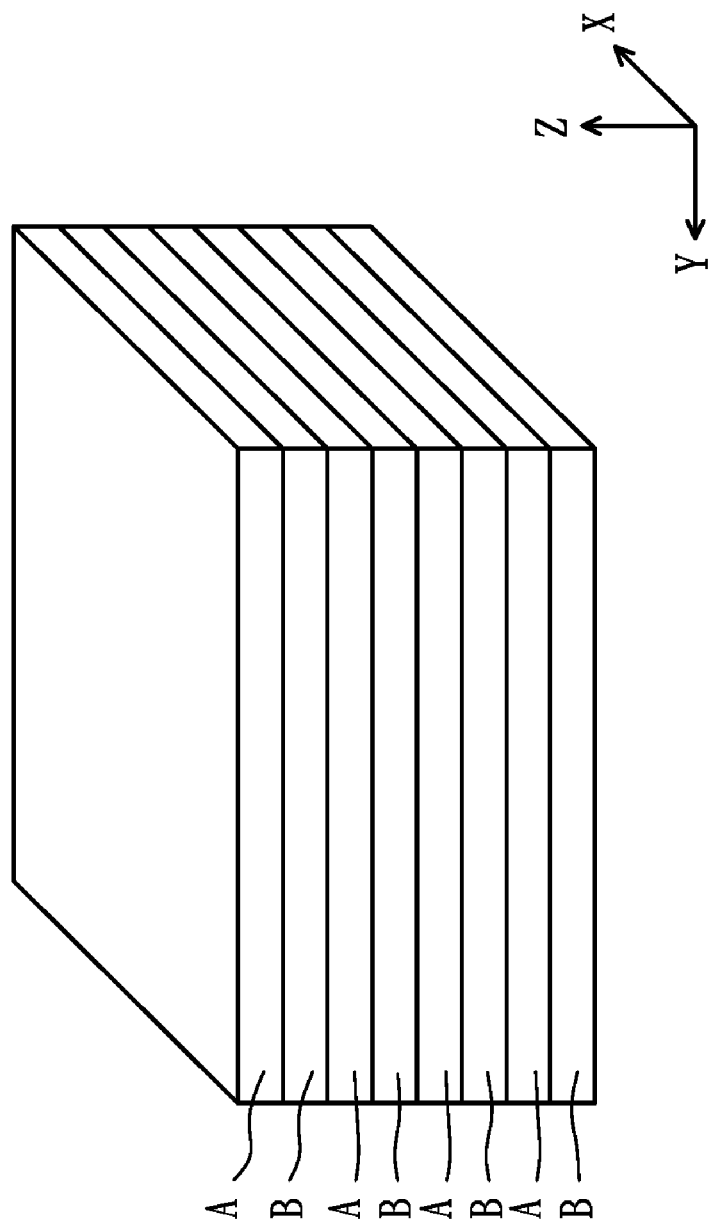
FIG. 3A is a schematic diagram for illustrating the structure of a DBEF reflective polarizer.

The DBEF reflective polarizer includes two different kinds of birefringent polymer materials which are stacked alternately, wherein the number of stack layers reaches 400 to 800. As shown in FIG. 3A, the birefringent polymer A and the birefringent polymer B are formed by extrusion. During the extrusion, the birefringent polymer A and the birefringent polymer B are stretched in the Y-axis direction but not stretched in X-axis direction. Then, the birefringent polymer A and the birefringent polymer B are alternately stacked and bonded via adhesive to form multi-layer stacked structure.

Figure 3C:
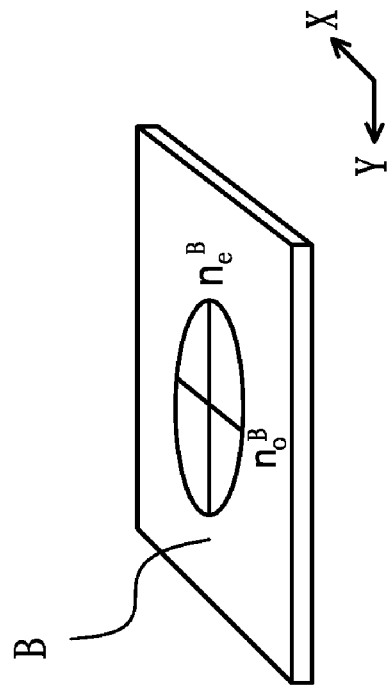
FIG. 3C is a refractive index diagram of a birefringent polymer B.
Figure 3B:
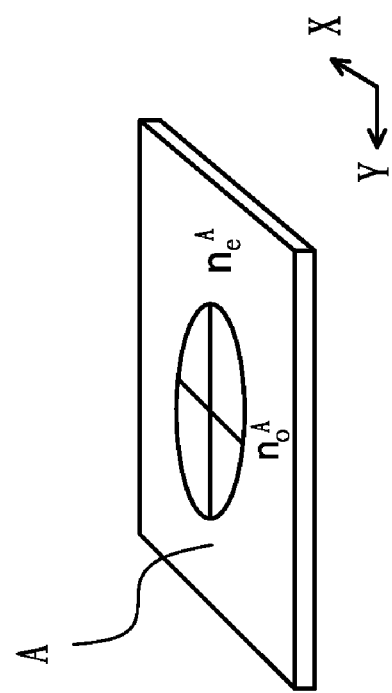
FIG. 3B is a refractive index diagram of a birefringent polymer A.

FIG. 3B is a refractive index diagram of a birefringent polymer A, wherein the refractive index of the X-axis direction is $n_o^A$, the refractive index of the Y-axis direction is $n_e^A$, and $n_o^A \neq n_e^A$.

FIG. 3C is a refractive index diagram of a birefringent polymer B, wherein the refractive index of the X-axis direction is $n_o^B$, the refractive index of the Y-axis direction is $n_e^B$, $n_o^A = n_o^B$, and $n_e^A > n_e^B$.

Figure 3D:
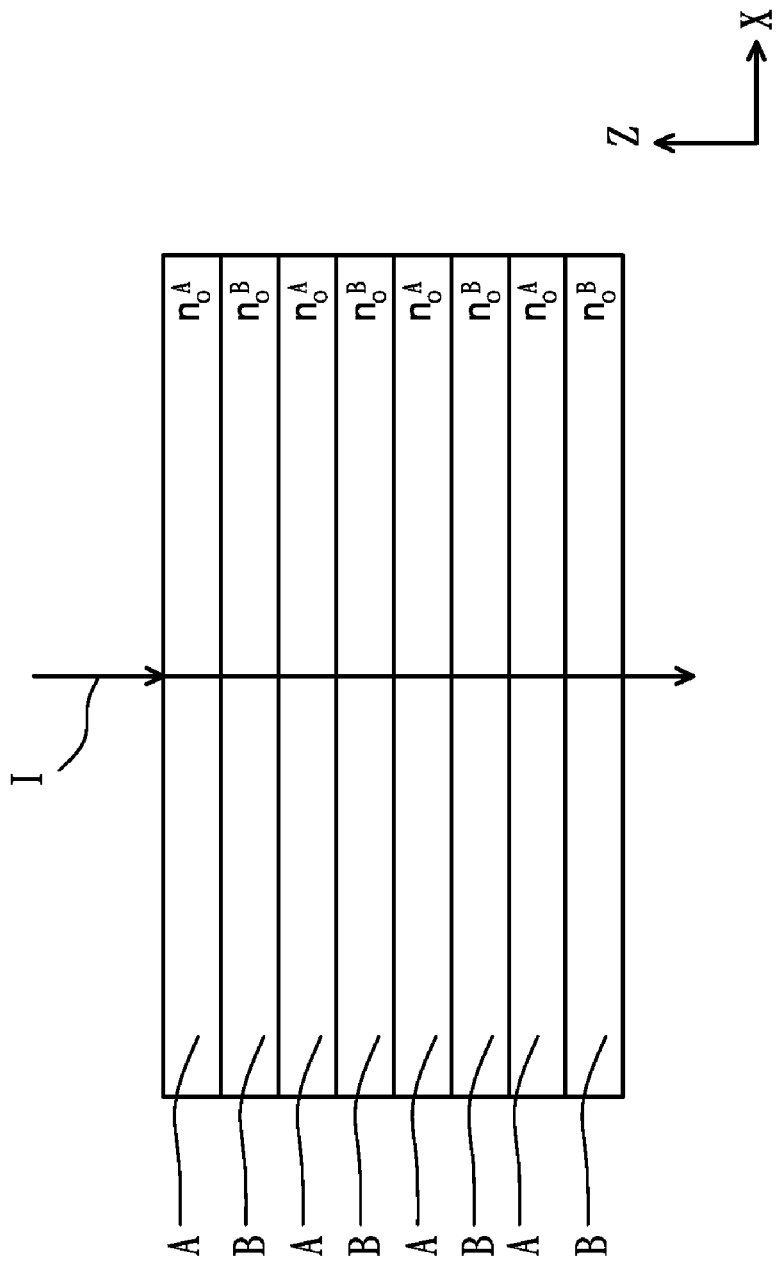
FIG. 3D is a schematic diagram for illustrating X direction polarized light incident on a DBEF reflective polarizer.

FIG. 3D is a schematic diagram illustrating X-direction polarized light passing through the DBEF reflective polarizer. Because the refractive index $n_o^B = n_o^A$, the incident light I (X-direction polarized light) is capable of passing through the DBEF reflective polarizer.

Figure 3E:
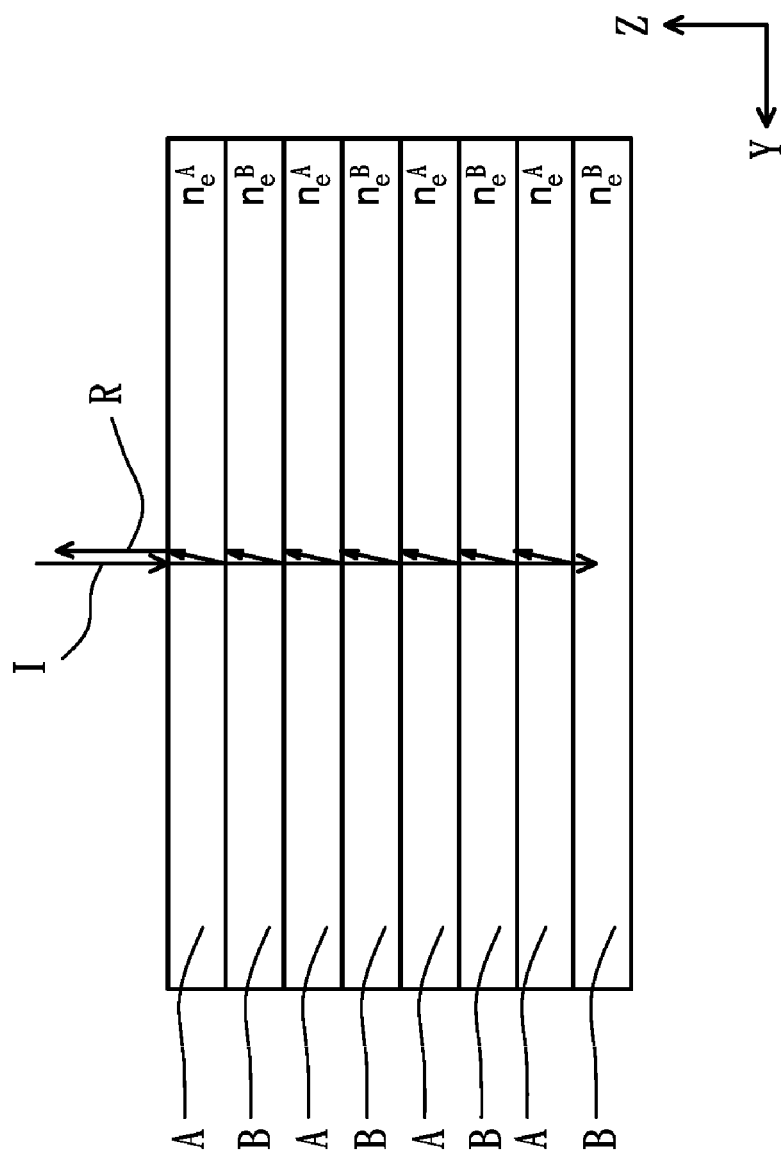
FIG. 3E is a schematic diagram for illustrating Y direction polarized light incident on a DBEF reflective polarizer.

FIG. 3E is a schematic diagram illustrating Y-direction polarized light passing through the DBEF reflective polarizer, wherein the refractive index $n_e^A > n_e^B$. When the incident light I (Y-direction polarized light) passes through the multi-layer materials with high and low refractive index, both light transmission and light reflection occur because of the difference of the refractive indexes between the layers. However, there is almost no transmitted light but only reflected light after propagation of light through hundreds of interface layers. The light beams reflected by all interfaces interfere with each other to form a bunch of reflected light R (Y-direction polarized light). That's why the Y-axis polarized light is directly reflected by a DBEF reflective polarizer.

Figure 4:
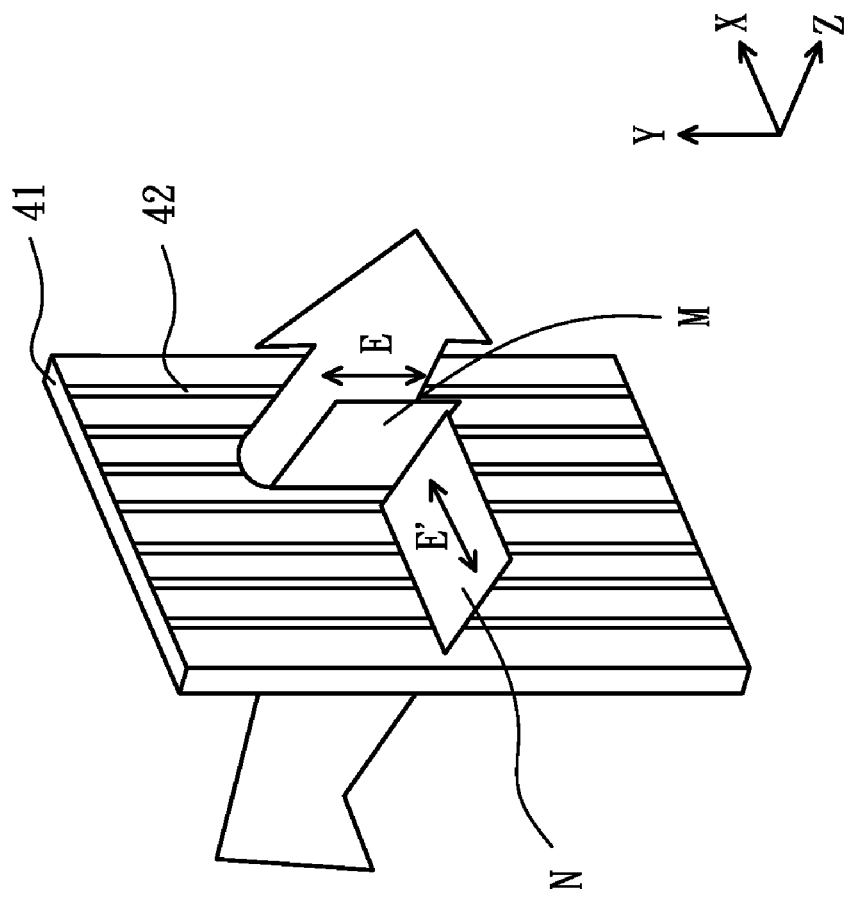
FIG. 4 is a schematic diagram for illustrating the structure of a wire grid reflective polarizer.

FIG. 4 is a schematic diagram illustrating the structure of wire grid reflective polarizer, wherein a transparent substrate 41 is coated with many fine metal wires 42 that are parallel to each other. The metal wire 42 is oriented in the Y-axis direction as in the figure. When the unpolarized light (including X-direction polarized light N and Y-direction polarized light M) is incident on the metal wire grid reflective polarizer 4, the Y-direction polarized light M cannot pass through the metal wire grid reflective polarizer 4 and is reflected back by the metal wire grid polarizer 4, and the X-direction polarized light N can pass through the metal wire grid reflective polarizer 4.

The operation principle of metal wire grid reflective polarizer 4 is introduced as follows: the electric field direction of the Y-direction polarized light M is the same as the orientations of the metal wire 42. Under the electric field E, the conduction electrons of the metal wire 42 are driven to move and generate a current. The acceleration of the conductive electrons in the metal wire 42 results in electromagnetic radiation in both +Z and −Z directions. The incident Y-direction polarized light M counteracts the electromagnetic radiation in −Z-direction. Thus, the Y-direction polarized light M cannot pass through the metal wire grid reflective polarizer 4. The electromagnetic radiation in +Z-direction becomes reflective light. That is to say the Y-direction polarized light M is reflected back by the metal wire grid reflective polarizer 4. The electric field direction of X-direction polarized light N is perpendicular to the orientation of the metal wire 42. In the electric field E', electrons are driven but fail to move far in the direction perpendicular to the metal wire 42. Thus, the X-direction polarized light N is capable of passing through the metal wire grid reflective polarizer 4 without being changed. That is to say the X-direction polarized light N is capable of directly passing through the metal wire grid reflective polarizer 4.

Referring back to FIG. 2, in addition to the reflective polarizer 204 used for recycling the polarized light, the following conditions are provided in the invention to promote the performance: the lens array 202 includes 3×5 pieces of micro biconvex lenses with spherical or aspheric surfaces which are used to homogenize the unpolarized light $U_{201}$; the polarization conversion system 203 is placed on the focus of lens array 202; and both the thickness of the polarization beam splitter 2031 and the intervals between the retarders 2032 are set to a/2 while the length of the micro biconvex lens is a.

Figure 5:
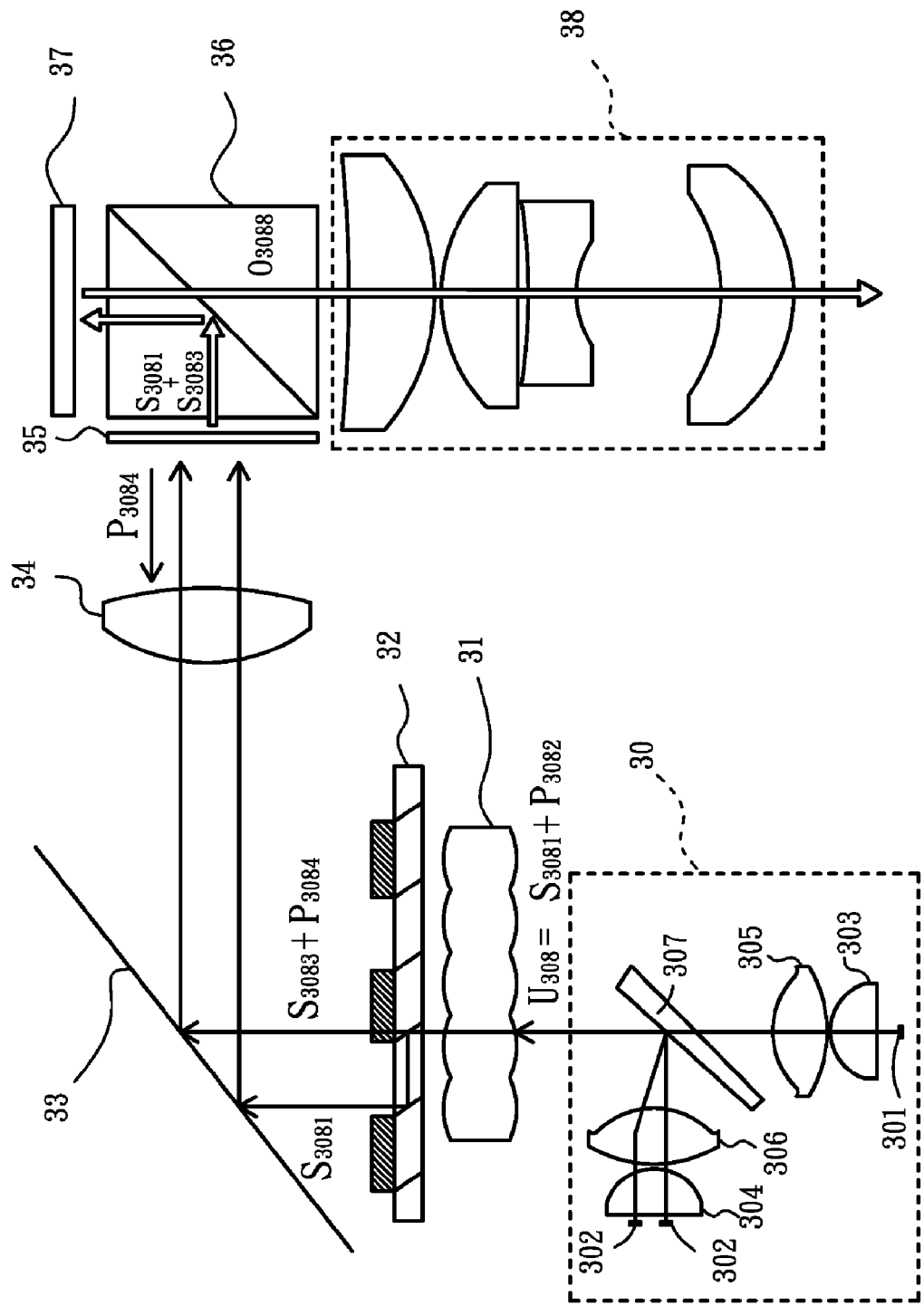
FIG. 5 is a schematic diagram of a projector in accordance with a first embodiment of the invention.

FIG. 5 is a schematic diagram of a projector in accordance with a first embodiment of the invention. As shown in figure, the projector includes a light source module 30, a lens array 31, a polarization conversion system 32, a mirror 33, a condenser lens 34, a reflective polarizer 35, a polarization beam splitter 36, a liquid crystal panel 37 and a projection lens 38. The light source module 30 includes a first light source 301, two second light source 302, a plurality of collimating lenses 303, 304, 305, 306 and a light source combiner 307. The light source module 30 is used to emit an unpolarized light $U_{308}$. The unpolarized light $U_{308}$ includes the first S-polarized light $S_{3081}$ and the first P-polarized light $P_{3082}$. The first S-polarized light $S_{3081}$, second S-polarized light $S_{3083}$ and second P-polarized light $P_{3084}$ are obtained after the unpolarized light $U_{308}$ is focused by the lens array 31 and passes through the polarization conversion system 32. The first S-polarized light $S_{3081}$, the second S-polarized light $S_{3083}$ and the second P-polarized light $P_{3084}$ are directed by the mirror 33 to the condenser lens 34, and converged by the condenser lens 34 to the reflective polarizer 35. The first S-polarized light $S_{3081}$ and the second S-polarized light $S_{3083}$ pass through the reflective polarizer 35. The second P-polarized light $P_{3084}$ is reflected to the polarization conversion system 32 and converted into the third S-polarized light (not shown) for use. This cycle repeatedly continues to generate the fourth S-polarized light, a fifth S-polarized light . . . and finally obtain S-polarized light with high purity.

The reflective polarizer 35 is deposed in front of the polarization beam splitter 36 and substantially parallel to the polarization beam splitter 36. After passing through the reflective polarizer 35, the S-polarized light (including the first S-polarized light $S_{3081}$, the second S-polarized light $S_{3083}$ as shown and other S-polarized light not shown) is directed to the liquid crystal panel 37 by the polarization beam splitter 36. The liquid crystal panel 37 adds image information therein to generate exit light $O_{3088}$. The exit light $O_{3088}$ is projected by the projection lens 38.

From the above descriptions, the invention uses the reflective polarizer 35 to reflect P-polarized light which is originally useless for liquid crystal panel 37 back to the polarization conversion system 32 in which the P-polarized light is converted into useful S-polarized light. Thus, the performance of the projector, such as brightness and contrast ratio, can be enhanced without increasing the output power of the light source, the quantity of the light sources, and the volume of the optical engine.

Figure 6:
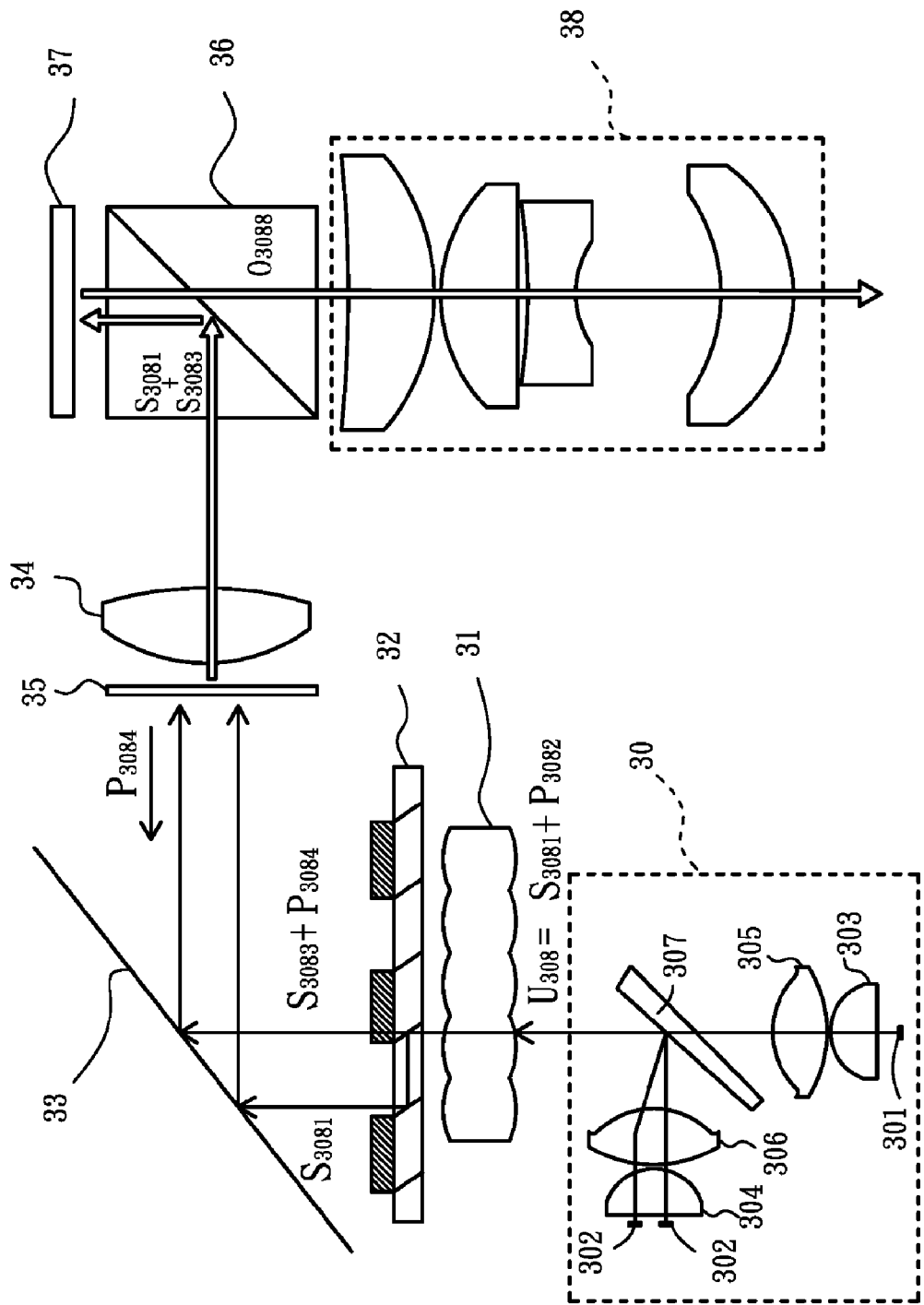
FIG. 6 is a schematic diagram of a projector in accordance with a second embodiment of the invention.

FIG. 6 is a schematic diagram of a projector in accordance with a second embodiment of the invention. The second embodiment differs from the first embodiment in that the reflective polarizer 35 is deposed in front of the condenser lens 34 and substantially parallel to the condenser lens 34. Thus, the second P-polarized light $P_{3084}$ and other P-polarized light are earlier reflected back to the polarization conversion system 32 to be converted into useful S-polarized light.

Figure 7:
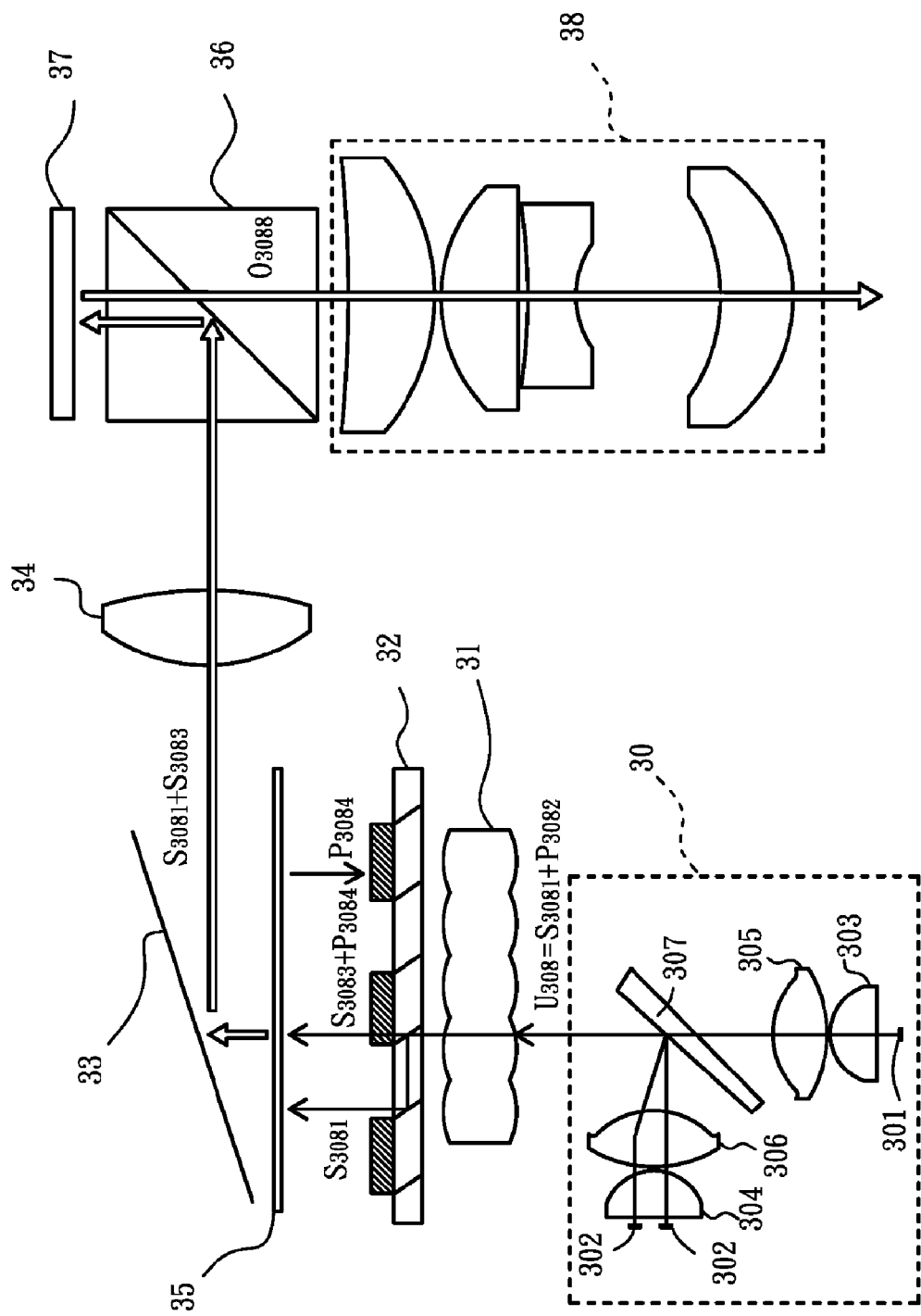
FIG. 7 is a schematic diagram of a projector in accordance with a third embodiment of the invention.

FIG. 7 is a schematic diagram of a projector in accordance with a third embodiment of the invention. The third embodiment differs from the first and second embodiments in that the reflective polarizer 35 is deposed in front of the mirror 33 and substantially parallel to the polarization conversion system 32. Thus, the second P-polarized light $P_{3084}$ and other P-polarized light are earlier reflected back to the polarization conversion system 32 to be converted into useful S-polarized light.

While the invention has been described by way of examples and in terms of embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A projector comprising:
    a light source module emitting unpolarized light which comprises first S-polarized light and first P-polarized light;
    a polarization conversion system receiving the unpolarized light, wherein the first S-polarized light passes through the polarization conversion system, a part of the first P-polarized light is converted into second S-polarized light after passing through the polarization conversion system, and another part of the first P-polarized light remains unchanged after passing through the polarization conversion system;
    a reflective polarizer allowing the first S-polarized light and the second S-polarized light to pass through and reflecting the first P-polarized light back to the polarization conversion system;
    a liquid crystal panal adding image information to the first S-polarized light and the second S-polarized light to obtain a projection light; and
    a projection lens projecting the projection light.

2. The projector as claimed in claim 1, further comprising a lens array which homogenizes the unpolarized light before the unpolarized light is received by the polarization conversion system.

3. The projector as claimed in claim 2, wherein the lens array comprises 3×5 pieces of micro biconvex lenses with spherical surfaces, or 3×5 pieces of micro biconvex lenses with aspheric surfaces.

4. The projector as claimed in claim 3, wherein the polarization conversion system comprises a plurality of strip-shaped polarized beam splitters and retarders, a thickness of the polarization beam splitters and an interval between the retarders are both substantially equal to a half of length of the micro biconvex lens.

5. The projector as claimed in claim 2, wherein the polarization conversion system is disposed at a focus of the lens array.

6. The projector as claimed in claim 1, further comprising a polarization beam splitter which is substantially parallel to the reflective polarizer and directs the first S-polarized light and the second S-polarized light which pass through the reflective polarizer to the liquid crystal panel.

7. The projector as claimed in claim 1, further comprising a condenser lens which focuses the first S-polarized light and the second S-polarized light generated by the polarization conversion system.

8. The projector as claimed in claim 7, wherein the condenser lens is substantially parallel to the reflective polarizer, and the first S-polarized light and the second S-polarized light pass through the reflective polarizer before reaching the condenser lens.

9. The projector as claimed in claim 1, wherein the reflective polarizer is Substantially parallel to the polarization conversion system.

10. The projector as claimed in claim 9, further comprising a mirror which changes a propagation direction of the first S-polarized light and the second S-polarized light generated by the polarization conversion system, wherein the first S-polarized light and the second S-polarized light pass through the reflective polarizer first before reaching the mirror.

* * * * *